(12) United States Patent
Inoue et al.

(10) Patent No.: US 12,154,728 B2
(45) Date of Patent: Nov. 26, 2024

(54) CAPACITOR ELEMENT, ELECTROLYTIC CAPACITOR, AND METHODS FOR MANUFACTURING SAME

(71) Applicant: Panasonic Intellectual Property Management Co., Ltd., Osaka (JP)

(72) Inventors: Masamichi Inoue, Osaka (JP); Katsuhisa Ishizaki, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 246 days.

(21) Appl. No.: 17/756,766

(22) PCT Filed: Dec. 22, 2020

(86) PCT No.: PCT/JP2020/047883
§ 371 (c)(1),
(2) Date: Jun. 1, 2022

(87) PCT Pub. No.: WO2021/132220
PCT Pub. Date: Jul. 1, 2021

(65) Prior Publication Data
US 2023/0005671 A1     Jan. 5, 2023

(30) Foreign Application Priority Data
Dec. 25, 2019    (JP) ................................ 2019-235136

(51) Int. Cl.
*H01G 9/26*      (2006.01)
*H01G 9/00*      (2006.01)
(Continued)

(52) U.S. Cl.
CPC ............. *H01G 9/26* (2013.01); *H01G 9/0032* (2013.01); *H01G 9/048* (2013.01); *H01G 9/15* (2013.01)

(58) Field of Classification Search
CPC .......... H01G 9/23; H01G 9/26; H01G 9/0032; H01G 9/048; H01G 9/15
See application file for complete search history.

(56) References Cited

U.S. PATENT DOCUMENTS

| 2004/0027789 A1 | 2/2004 | Kochi et al. |
| 2009/0086413 A1* | 4/2009 | Takatani .................. H01G 9/15 29/25.03 |

(Continued)

FOREIGN PATENT DOCUMENTS

| JP | 2004-088073 | 3/2004 | |
| WO | 2013/046869 | 4/2013 | |
| WO | WO-2013046869 A1 * | 4/2013 | ............... H01G 9/04 |

OTHER PUBLICATIONS

International Search Report of PCT application No. PCT/JP2020/047883 dated Mar. 16, 2021.

*Primary Examiner* — Michael P McFadden
(74) *Attorney, Agent, or Firm* — Rimon P.C.

(57) ABSTRACT

A capacitor element includes an anode body including a porous region located at a surface of the anode body, a dielectric layer that covers at least a part of the anode body, and a cathode layer that covers at least a part of the dielectric layer. The anode body includes an anode part and a cathode formation part on which the cathode layer is disposed, the cathode formation part being adjacent to the anode part. At least a part of the porous region of the anode part includes a thin-thickness region that is thinner than the porous region in the cathode formation part, and a metal substrate is stacked on at least a part of the thin-thickness region. The metal substrate is denser than the porous region in the cathode formation part.

9 Claims, 11 Drawing Sheets

(51) Int. Cl.
*H01G 9/048* (2006.01)
*H01G 9/15* (2006.01)

(56) References Cited

U.S. PATENT DOCUMENTS

| | | | |
|---|---|---|---|
| 2010/0039751 A1* | 2/2010 | Oohata | H01G 9/042 |
| | | | 361/523 |
| 2013/0182374 A1* | 7/2013 | Mizukoshi | H01G 9/15 |
| | | | 29/25.03 |
| 2017/0140877 A1* | 5/2017 | Kuromi | H01G 9/012 |
| 2020/0266005 A1* | 8/2020 | Suzuki | H01G 9/048 |
| 2022/0102081 A1* | 3/2022 | Hirota | H01G 9/0425 |

* cited by examiner

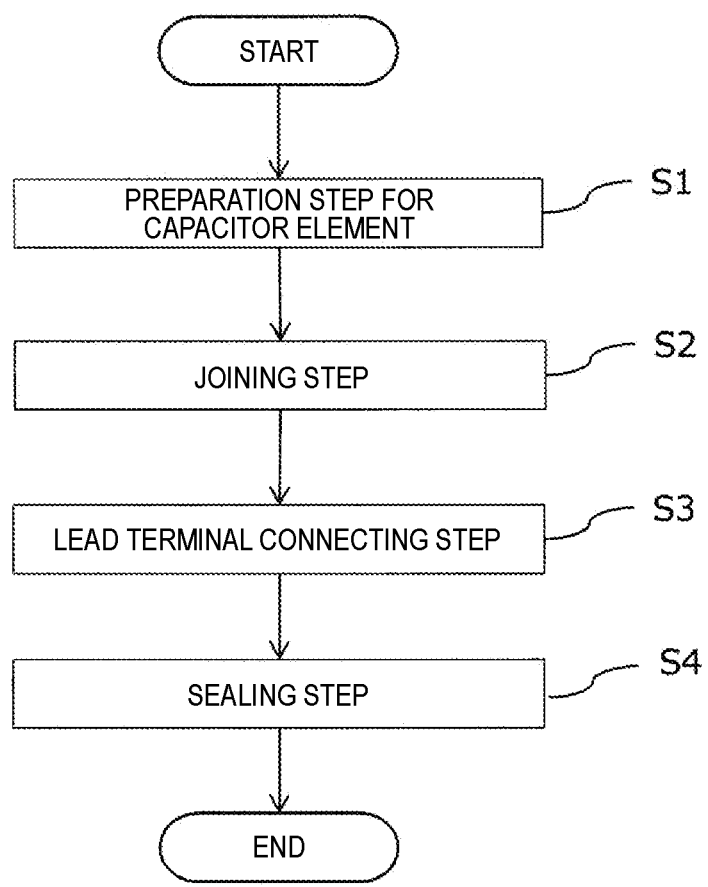

CAPACITOR ELEMENT, ELECTROLYTIC CAPACITOR, AND METHODS FOR MANUFACTURING SAME

TECHNICAL FIELD

The present invention relates to a capacitor element, an electrolytic capacitor, and a method of manufacturing the capacitor element and the electrolytic capacitor.

BACKGROUND

Electrolytic capacitors are mounted on various electronic devices because of their small equivalent series resistance (ESR) and excellent frequency characteristics. A capacitor element used in an electrolytic capacitor includes, as an anode body, a foil containing a valve metal such as titanium, tantalum, aluminum, or niobium. An anode part and a cathode formation part are usually defined in the anode body. A cathode layer including a solid electrolyte layer and a cathode lead-out layer is formed on a surface of the cathode formation part in the anode body.

A high-capacitance electrolytic capacitor is required according to upgrading functionality of electronic devices. Thus, it has been proposed that a plurality of capacitor elements are stacked and disposed in an electrolytic capacitor. The anode parts of the capacitor elements are joined to each other by welding, for example Unexamined Japanese Patent Publication No. 2004-088073).

SUMMARY

A first aspect of the present invention relates to a capacitor element. The capacitor element includes: an anode body including a porous region located at a surface of the anode body; a dielectric layer that covers at least a part of the anode body; and a cathode layer that covers at least a part of the dielectric layer. The anode body includes an anode part and a cathode formation part on which the cathode layer is disposed. The cathode formation part is adjacent to the anode part. At least a part of the porous region of the anode part includes a thin-thickness region that is thinner than the porous region of the cathode formation part. A metal substrate is stacked on at least a part of the thin-thickness region. The metal substrate is denser than the porous region of the cathode formation part.

A second aspect of the present invention relates to an electrolytic capacitor including a plurality of capacitor elements which are stacked, the plurality of capacitor elements each being the capacitor element described above.

A third aspect of the present invention relates to a method of manufacturing a capacitor element. The method includes: a preparation step of preparing an anode body including a porous region located at a surface of the anode body; a dielectric layer forming step of forming a dielectric layer that covers at least a part of the anode body; a thin-thickness region forming step of forming a thin-thickness in the anode body by compressing or removing a part of the porous region; a stacking step of stacking a metal substrate on at least a part of the thin-thickness region; and a cathode forming step of forming a cathode layer on a cathode formation part in a part other than the thin-thickness region of the anode body. The metal substrate stacked is denser than the porous region of the cathode formation part.

A fourth aspect of the present invention relates to a method of manufacturing an electrolytic capacitor. The method includes: a step of preparing a capacitor element manufactured by the method described above; and a joining step of, after stacking a plurality of capacitor elements, welding thin-thickness regions of the plurality of capacitor elements to each other together with the metal substrate.

An electrolytic capacitor with reduced ESR can be achieved.

BRIEF DESCRIPTION OF THE DRAWINGS

FIG. 8 is a flowchart showing a method of manufacturing the electrolytic capacitor according to the exemplary embodiment of the present invention.

DESCRIPTION OF EMBODIMENT

Figure 1A:
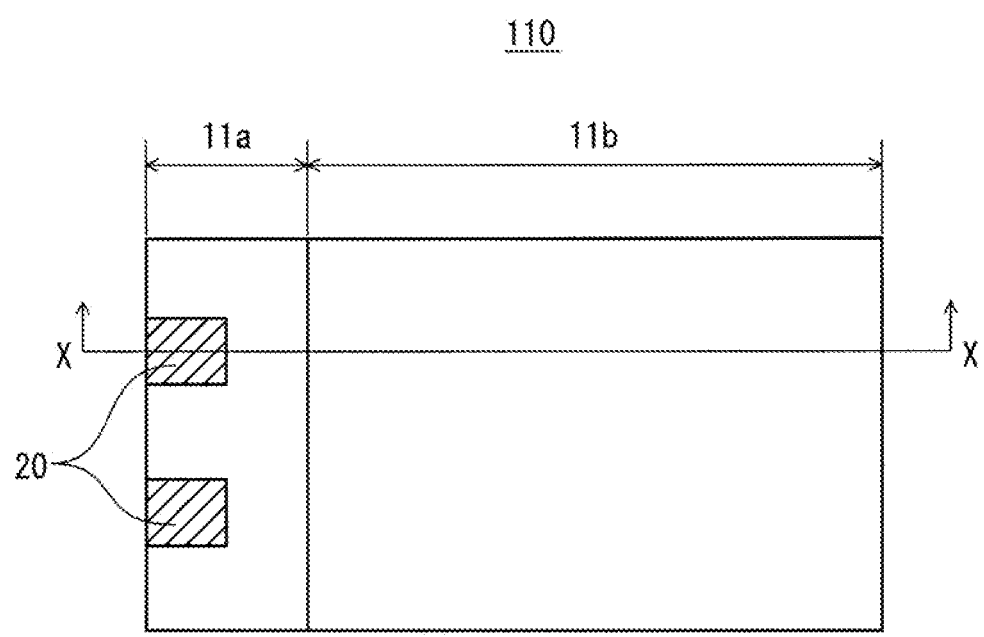
FIG. 1A is a top view schematically illustrating a capacitor element according to an exemplary embodiment of the present invention.

An electrolytic capacitor including stacked capacitor elements tends to increase ESR.

[Capacitor Element]

In order to increase electrostatic capacity, a porous region is usually formed at a surface of an anode body. When anode parts of a plurality of capacitor elements that are stacked are welded to each other, larger voids (voids) may be formed in the porous region. Thus, electrical resistance in the anode parts increases, and ESR tends to increase. Furthermore, a strength of the capacitor elements in the welded part may decrease. In addition, oxygen entering from the anode parts easily reaches a cathode formation part through the void, and deterioration of a solid electrolyte layer proceeds.

In a capacitor element according to the present exemplary embodiment, a porous region of an anode part is thinned to form a thin-thickness region, and a dense metal substrate is stacked on a part of the thin-thickness region. By welding the capacitor elements to each other in the stacked part, an occupation ratio of voids in the welded part is reduced, or the voids themselves are reduced. Hence, an increase in electrical resistance is suppressed, and movement of oxygen is also suppressed. Furthermore, since the thin-thickness region is reinforced by the metal substrate, the strength of the capacitor element is increased.

A cathode layer (for example, a solid electrolyte layer and a cathode lead-out layer) is formed on a cathode formation part of an anode body. Thus, a thickness of the cathode formation part of the capacitor element is greater than that of the anode part. When a plurality of the capacitor elements are stacked and the anode parts are joined to each other, the anode body is bent in the vicinity of a boundary between the anode part and the cathode layer. Hence, the anode body is easily damaged at the bent part. When the thin-thickness region is provided in the anode part, a degree of bending is further increased. In the present exemplary embodiment, since the metal substrate is stacked on at least a part of the thin-thickness region, the plurality of capacitor elements can be stacked and joined without increasing the degree of bending.

The thicker the porous region, the lower the strength of the capacitor element. However, in the present exemplary embodiment, since the thin-thickness region is reinforced by the metal substrate, the porous region can be thickened. That is, the porous region of the cathode formation part can be thickened. Hence, an increase in electrostatic capacity is expected. In the cathode formation part, a thickness of the porous region may be 95% or more of a thickness of the entire anode body. From the viewpoint of strength, the thickness of the porous region in the cathode formation part is preferably 98% or less of the thickness of the entire anode body.

The thin-thickness region may be formed in a part of the anode part. From the viewpoint of blocking oxygen, the thin-thickness region is preferably formed in a band shape along a boundary between the anode part and the cathode formation part. The thin-thickness region is more preferably formed in a band shape in the vicinity of the boundary between the anode part and the cathode formation part. This is because penetration of solid electrolyte into the anode part is easily suppressed by the thin-thickness region in a step of forming the solid electrolyte layer. The thin-thickness region may be formed over the entire anode part.

The thin-thickness region may be formed by removing a part of the porous region, or may be formed by compressing a part of the porous region. Among them, it is preferable that the thin-thickness region is formed by compressing the porous region. Since a compression layer having a smaller porosity is formed in the thin-thickness region by the compression of the porous region, an effect of suppressing electrical resistance and an effect of suppressing oxygen transfer are further enhanced.

The metal substrate is stacked on at least a part of the thin-thickness region. The part where the metal substrate is stacked is suitable as a welded part. From the viewpoint of blocking oxygen, the metal substrate is preferably stacked in a band shape along the boundary between the anode part and the cathode formation part. From the viewpoint of strength, the metal substrate is preferably stacked on the entire thin-thickness region.

Hereinafter, a capacitor element according to the present exemplary embodiment will be specifically described with reference to the drawings. However, the present exemplary embodiment is not limited thereto.

First Exemplary Embodiment

The capacitor element according to the present exemplary embodiment includes an island-shaped thin-thickness region in a part of an anode part, which is to be welded. An area of the thin-thickness region is, for example, equal to or more than 3% and less than 10% in an area of the anode part. A metal substrate is stacked on an entire area of the thin-thickness region. By this configuration, an increase in electrical resistance due to welding is suppressed. Furthermore, the movement of oxygen is also suppressed.

Figure 1B:
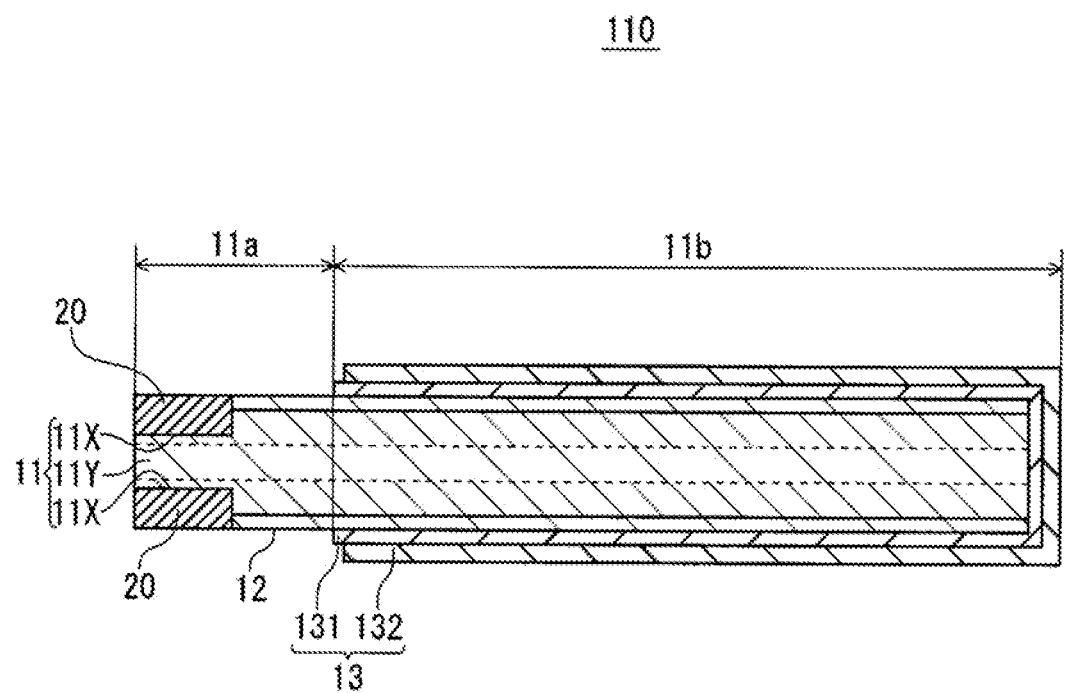
FIG. 1B is a cross-sectional view schematically illustrating the capacitor element taken along line X-X in FIG. 1A.

FIG. 1A is a top view schematically illustrating a capacitor element according to the present exemplary embodiment. FIG. 1B is a cross-sectional view schematically illustrating the capacitor element taken along line X-X in FIG. 1A.

Capacitor element 110 has, for example, a sheet shape. Capacitor element 110 includes anode body 11, dielectric layer 12 covering at least a part of anode body 11, and cathode layer 13 covering at least a part of the dielectric layer. Cathode layer 13 includes solid electrolyte layer 131 and cathode lead-out layer 132 covering at least a part of solid electrolyte layer 131.

Anode body 11 includes anode part 11a and cathode formation part 11b. Porous regions 11X are disposed at both principal surfaces of anode body 11. Core region 11Y is disposed between two porous regions 11X. A thickness of core region 11Y may be smaller than that shown in FIG. 1B.

Two island-shaped thin-thickness regions are formed in a part of anode part 11a. A thickness of porous region 11X of the thin-thickness region is thinner than porous region 11X of cathode formation part 11b. Metal substrate 20 is stacked on the entire area of the thin-thickness region. A plurality of capacitor elements 110 are welded to each other at the thin-thickness region.

Second Exemplary Embodiment

A capacitor element according to the present exemplary embodiment includes a thin-thickness region which has a band shape along a boundary between the anode part and a cathode and is located at a side close to an end part of an anode part. An area of the thin-thickness region is, for example, equal to or more than 10% and less than 50% in an area of the anode part. A metal substrate is stacked on the entire area of the thin-thickness region. By this configuration, an increase in electrical resistance due to welding is suppressed. Furthermore, the movement of oxygen is also suppressed. In addition, the strength of the capacitor element is increased.

Figure 2:
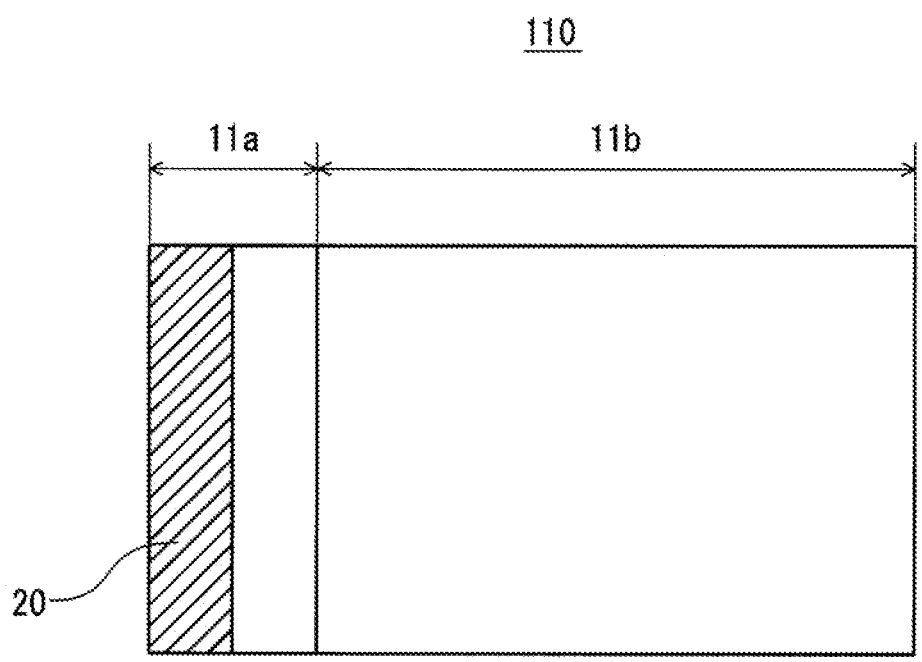
FIG. 2 is a top view schematically illustrating a capacitor element according to another exemplary embodiment of the present invention.

FIG. 2 is a top view schematically illustrating the capacitor element according to the present exemplary embodiment. The present exemplary embodiment has the same configuration as that of the first exemplary embodiment except that a band-shaped thin-thickness region is formed at a side close to the end part of anode part 11a. Metal substrate 20 is stacked on the entire area of the thin-thickness region. The capacitor element according to the present exemplary embodiment has a cross section similar to that in FIG. 1B.

Third Exemplary Embodiment

A capacitor element according to the present exemplary embodiment includes a thin-thickness region which has a band shape along a boundary between the anode part and a cathode and is located at a side close to an end part of an anode part. The thin-thickness region in the present exemplary embodiment has an area wider than that of the thin-thickness region in the second exemplary embodiment. Thus, when a plurality of capacitor elements are stacked, each of the plurality of capacitor elements is bent at a part including the thin-thickness region. An area of the thin-thickness region is, for example, equal to or more than 50% and less than 80% in an area of the anode part. A metal substrate is stacked on the entire area of the thin-thickness region. By this configuration, an increase in electrical resistance due to welding is suppressed. Furthermore, the movement of oxygen is also suppressed. In addition, the strength of the capacitor element is further enhanced.

Figure 3A:
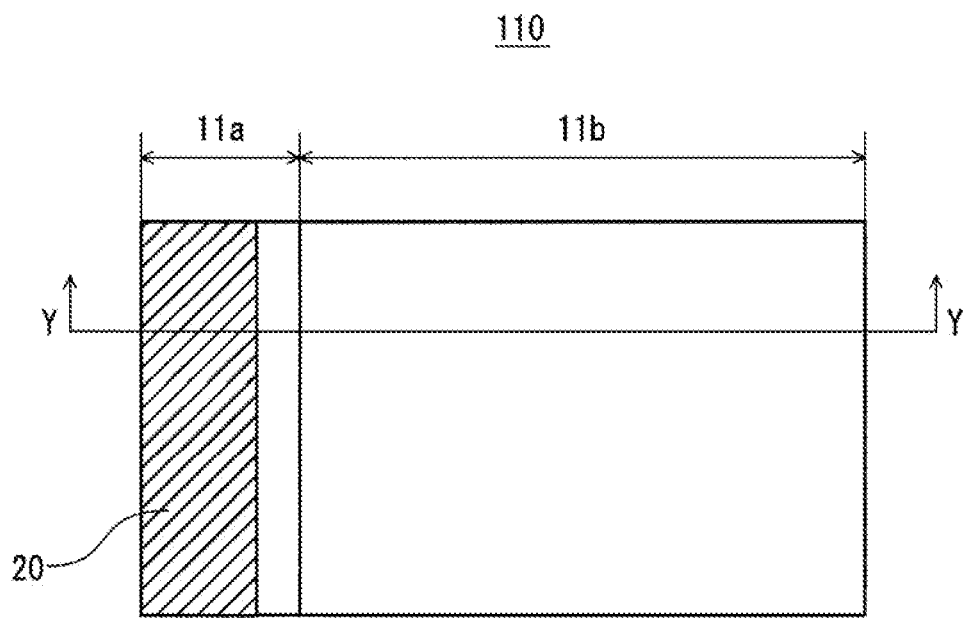
FIG. 3A is a top view schematically illustrating a capacitor element according to still another exemplary embodiment of the present invention.
Figure 3B:
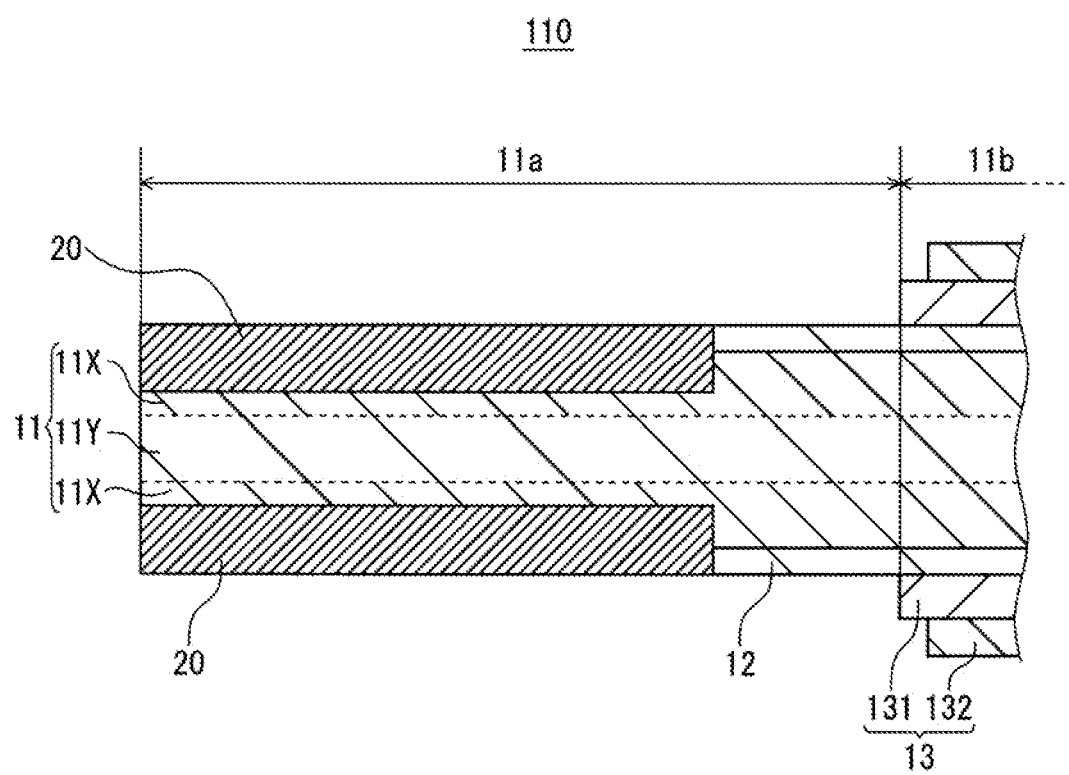
FIG. 3B is a cross-sectional view schematically illustrating a main part of the capacitor element taken along line Y-Y in FIG. 3A.

FIG. 3A is a top view schematically illustrating the capacitor element according to the present exemplary embodiment. FIG. 3B is a cross-sectional view schematically illustrating the capacitor element taken along line Y-Y in FIG. 3A.

The present exemplary embodiment has the same configuration as that of the first exemplary embodiment except that a band-shaped thin-thickness region is formed in a part including an end part of anode part 11a. Metal substrate 20 is stacked on the entire area of the thin-thickness region.

Fourth Exemplary Embodiment

A capacitor element according to the present exemplary embodiment includes a thin-thickness region over an entire area of the anode part. The thin-thickness region is disposed over the entire are of the anode part. A metal substrate is stacked on the entire area of the thin-thickness region. By This configuration, an increase in electrical resistance due to welding is suppressed. Furthermore, the movement of oxygen is further suppressed. In addition, the strength of the capacitor element is increased, and the penetration of solid electrolyte into the anode part is suppressed.

Figure 4A:
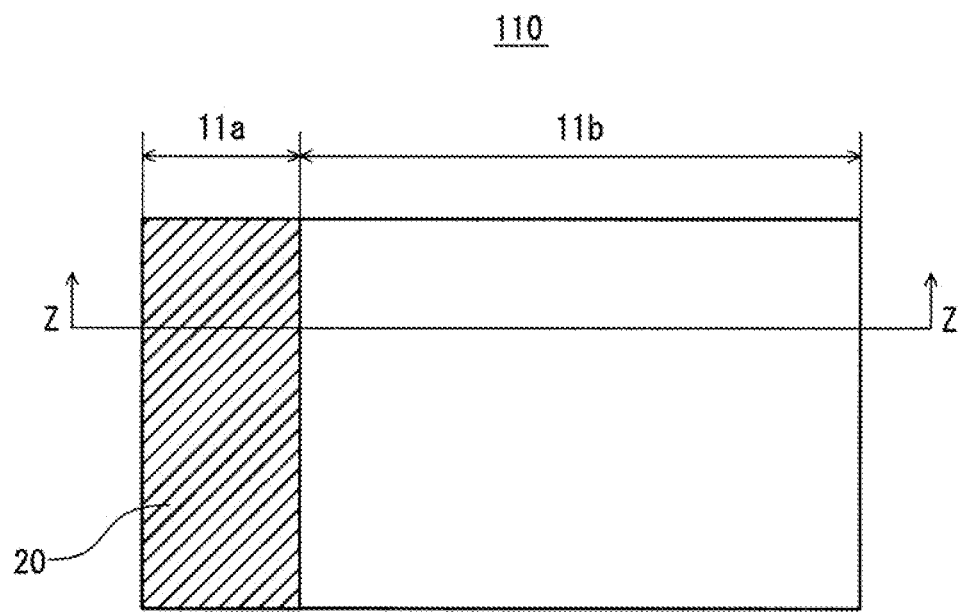
FIG. 4A is a top view schematically illustrating a capacitor element according to still another exemplary embodiment of the present invention.
Figure 4B:
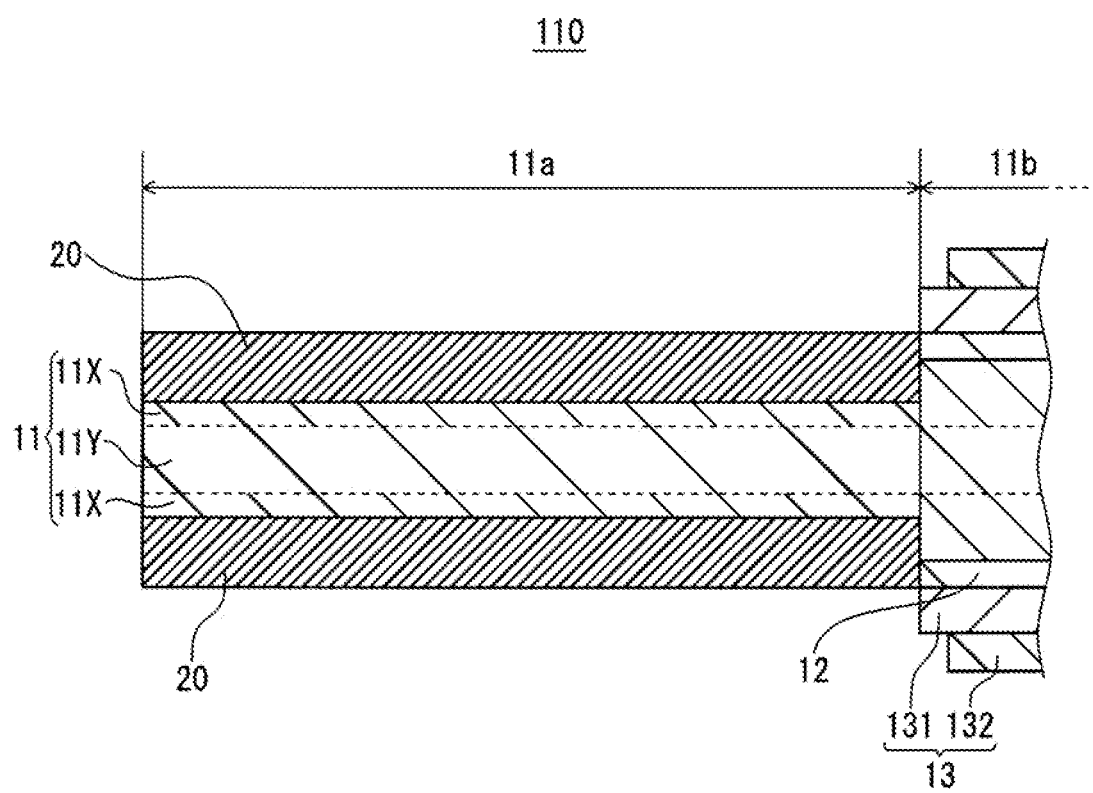
FIG. 4B is a cross-sectional view schematically illustrating a main part of the capacitor element taken along line Z-Z in FIG. 4A.

FIG. 4A is a top view schematically illustrating the capacitor element according to the present exemplary embodiment. FIG. 4B is a cross-sectional view schematically illustrating the capacitor element taken along line Z-Z in FIG. 4A.

The present exemplary embodiment has the same configuration as that of the first exemplary embodiment except that a thin-thickness region is formed over the entire area of anode part 11a. Metal substrate 20 is stacked on the entire area of the thin-thickness region.

(Thin-Thickness Region)

The thin-thickness region is formed in at least a part of the anode part. The porous region of the thin-thickness region is thinner than the porous region of the cathode formation part. Thus, oxygen entering from the anode part is less likely to reach the cathode formation part through the thin-thickness region. The thin-thickness region also suppresses penetration of the solid electrolyte into the anode part from the porous region of the cathode formation part in the step of forming the solid electrolyte layer.

The thickness of the porous region of the thin-thickness region is not particularly limited. The thickness of the porous region of the thin-thickness region is preferably equal to or less than 50%, preferably equal to or less than 40%, and preferably equal to or less than 30% of the thickness of the porous region of the cathode formation part. There may be no porous region in the thin-thickness region.

The thickness of the porous region of the thin-thickness region is obtained by averaging distance values at arbitrary three points in the cross section of the capacitor element. The distance value is obtained by measuring, in the thin-thickness region, a distance from a principal surface of the anode body to a boundary between the core region and the porous region near the principal surface. Similarly, the thickness of the porous region of the cathode formation part is obtained by averaging distance values at arbitrary three points in the cross section of the capacitor element. The distance value is obtained by measuring, in the cathode formation part, a distance from one principal surface of the anode body to a boundary between the core region and the porous region near the principal surface.

The thin-thickness region is formed, for example, by compressing the porous region of the anode body. In this case, the thin-thickness region has a compression layer obtained by compressing the porous region. The thin-thickness region may be formed by removing at least a part of the porous region by cutting, laser machining, or the like. The thin-thickness region may be formed by removing the entire porous region and exposing the core region. In particular, the thin-thickness region is preferably formed by compressing the porous region of the anode body. This is because the process is simple, and further improvement in oxygen blocking property can be expected.

(Metal Substrate)

The metal substrate is stacked on at least a part of the thin-thickness region. The metal substrate is denser than the porous region in the cathode formation part. By disposing a dense metal substrate instead of the porous region, an increase in electrical resistance of the anode part due to welding is suppressed, and the oxygen blocking property is improved. Furthermore, it is possible to avoid a decrease in strength of the capacitor element due to the formation of the thin-thickness region.

The description that the metal substrate is denser than the porous region of the cathode formation part means that an apparent density of the metal substrate is greater than an apparent density of the porous region of the cathode formation part. The apparent density is calculated by dividing the actual mass by the apparent volume including a void part.

Further, the description that the metal substrate is denser than the porous region of the cathode formation part also means that the porosity of the metal substrate is smaller than the porosity of the porous region of the cathode formation part. The porosity of the metal substrate may be, for example, equal to or less than 90%, equal to or less than 80%, or equal to or less than 60% of the porosity of the porous region of the cathode formation part. The metal substrate may have no hole therein. The porosity of the metal substrate is not particularly limited. The porosity of the metal substrate may be, for example, equal to or more than 0% and equal to or less than 55%.

The porosity can be calculated from an SEM image of a cross section obtained by cutting the capacitor element in a thickness direction. A part of the SEM image corresponding to the porous region of the cathode formation part is binarized in the void part and the other part so that an area proportion of the void part in the porous region is calculated. The obtained area proportion of the void part is defined as the porosity of the porous region of the cathode formation part. Similarly, an area proportion of a void part in the metal substrate is calculated from the SEM image, and the obtained area proportion of the void part is defined as the porosity of the metal substrate.

The metal substrate is a plate-shaped or foil-shaped member containing a metallic material. The thickness of the metal substrate is not particularly limited. The total thickness of the metal substrate and the anode body in the thin-thickness region may be smaller than, larger than, or the same as the thickness of the anode body in the cathode formation part. In particular, in view of easily welding the plurality of capacitor elements, the total thickness is preferably equal to or larger than the thickness of the anode body in the cathode formation part. The total thickness is preferably equal to or more than 100% and equal to or less than 120% of the thickness of the anode body in the cathode formation part.

The metallic material constituting the metal substrate is not particularly limited. The metal substrate preferably contains the same metallic material or valve metal as the anode body. In this case, electrical resistance, ease of welding, and the like between the anode body and the metal substrate are substantially the same, so that connection reliability is hardly impaired.

A surface (hereinafter, it may be referred to as a facing surface) facing the thin-thickness region of the metal substrate to be stacked is preferably roughened. This is because adhesion to the porous region is enhanced. The roughness of the facing surface is not particularly limited. The arithmetic average roughness Ra of the facing surface only has to be, for example, equal to or more than 20 nm. The arithmetic average roughness Ra is measured in accordance with JIS B 0601:2013. Similarly to the anode body, the metal substrate may have a porous region on a surface thereof. Similarly, a surface of the metal substrate opposite to the facing surface may be roughened. As a result, when a plurality of the capacitor elements are stacked, adhesion to an adjacent anode part tends to be increased.

The method of roughening is not particularly limited. The facing surface may be etched or roughened by a conventionally known surface treatment such as a plasma treatment or a blast treatment.

(Anode Body)

The anode body includes a foil (metal foil) containing a valve metal. Examples of the valve metal include titanium, tantalum, aluminum, niobium, or the like. The anode body contains one or more types of the valve metals. The anode body may contain the valve metal in the form of an alloy or an intermetallic compound. A thickness of the anode body is not particularly limited. The thickness of the anode body in a region other than the thin-thickness region ranges, for example, from 15 μm to 300 μm, inclusive, and may range from 80 μm to 250 μm, inclusive.

A principal surface of the anode body is roughened by electrolytic etching or the like. Thus, the anode body includes a porous region formed at a side close to the principal surface. An entirety of the anode body may be porous. From the viewpoint of strength, however, the anode body preferably includes the porous regions disposed at both principal surface sides, and a core region interposed between the porous regions. The core region has a lower porosity than that of the porous region. The porous region is a region having a large number of fine pores. The core region is, for example, a region that has not been subjected to electrolytic etching. The porous region and the core region can be distinguished from the cross section of the capacitor element.

The porosity of the porous region is not particularly limited. The porosity of the porous region may be, for example, equal to or more than 35% and equal to or less than 65%.

A thickness of the porous region is not particularly limited. As described above, from the viewpoint of increasing electrostatic capacity and strength, the thickness of the porous region of the cathode formation part is preferably equal to or more than 95% and equal to or less than 98% of the thickness of the entire anode body.

(Dielectric Layer)

The dielectric layer is formed on at least a part of the surface of the anode body. The dielectric layer is formed, for example, by anodizing the surface of the anode body with an anodizing treatment or the like. Hence, the dielectric layer can contain an oxide of the valve metal. When aluminum, for example, is used as the valve metal, the dielectric layer can contain $Al_2O_3$. Note that the dielectric layer is not limited thereto, and only has to be any one that functions as a dielectric material.

(Cathode Layer)

The cathode layer includes a solid electrolyte layer covering at least a part of the dielectric layer, and a cathode lead-out layer covering at least a part of the solid electrolyte layer.

The solid electrolyte layer only has to be formed to cover at least a part of the dielectric layer, and may be formed to cover the entire surface of the dielectric layer.

The solid electrolyte layer contains, for example, a manganese compound and a conductive polymer. Examples of the conductive polymer include polypyrrole, polythiophene, polyfuran, polyaniline, polyacetylene, polyphenylene, polyphenylene vinylene, polyacene, and polythiophene vinylene. These may be used alone, may be used in combination of two or more types, or may be a copolymer of two or more types of monomers.

Note that in the present specification, polypyrrole, polythiophene, polyfuran, polyaniline, and the like mean polymers having, as a basic skeleton, polypyrrole, polythiophene, polyfuran, polyaniline, and the like, respectively. Therefore, polypyrrole, polythiophene, polyfuran, polyaniline, and the like can also include derivatives thereof, respectively. For example, polythiophene contains poly (3,4-ethylenedioxythiophene) and the like.

The conductive polymer may be contained in the solid electrolyte layer together with a dopant. The dopant may be a monomolecular anion or a polymeric anion. Specific examples of the monomolecular anion include p-toluenesulfonic acid and naphthalenesulfonic acid. Specific examples of the polymeric anion include polyvinylsulfonic acid, polystyrenesulfonic acid, polyallylsulfonic acid, polyacrylsulfonic acid, polymethacrylsulfonic acid, poly (2-acrylamido-2-methylpropanesulfonic acid), polyisoprenesulfonic acid, and polyacrylic acid. These may be used alone, or may be used in combination of two or more types. Alternatively, these may be a polymer of a single monomer or a copolymer of two or more types of monomers. Among them, a polymeric anion derived from polystyrenesulfonic acid is preferable.

The cathode lead-out layer only has to be formed to cover at least a part of the solid electrolyte layer, and may be formed to cover the entire surface of the solid electrolyte layer.

The cathode lead-out layer includes, for example, a carbon layer and a metal (e.g., silver) paste layer formed on a surface of the carbon layer. The carbon layer is formed of a carbon paste containing a conductive carbon material such as graphite. The metal paste layer is formed of, for example, a composition containing silver particles and a resin. Note that the configuration of the cathode lead-out layer is not limited thereto, and only has to be any configuration having a current collecting function.

[Electrolytic Capacitor]

An electrolytic capacitor according to the present exemplary embodiment includes the capacitor element described above. The electrolytic capacitor may include a plurality of the capacitor elements. The plurality of the capacitor elements are stacked. The number of the stacked capacitor elements is not particularly limited, and ranges, for example, from 2 to 20, inclusive.

At least one of the plurality of capacitor elements only has to be the capacitor element according to the present exemplary embodiment. The others may be conventionally known capacitor elements. Preferably, all of the plurality of capacitor elements disposed in the electrolytic capacitor are the capacitor elements according to the present exemplary embodiment.

The anode parts of the stacked capacitor elements are joined by welding and electrically connected to each other. According to the present exemplary embodiment, since the stacked capacitor elements are welded at a part where the metal substrate is stacked, the occupation ratio of voids formed by welding is reduced, or the voids themselves are reduced. Thus, an increase in electrical resistance in the anode part is suppressed. A plurality of the anode parts may be caulked by bent anode lead terminals and then welded, for example.

The anode lead terminal is joined to the anode part of at least one capacitor element. Also in this case, a part of the anode part where the metal substrate is stacked may be welded to the anode lead terminal.

The cathode layers of the stacked capacitor elements are also electrically connected to each other. The cathode lead terminal is joined to a cathode layer of at least one capacitor element. The cathode lead terminal is joined via a conductive adhesive or solder, or by resistance welding or laser welding. The conductive adhesive is, for example, a mixture of a curable resin and carbon particles or metal particles.

(Lead Terminal)

A material of the lead terminal is not particularly limited as long as it is electrochemically and chemically stable and has conductivity, and may be metal or non-metal. The shape thereof is also not particularly limited. From the viewpoint of height reduction, a thickness of the lead terminal (distance between principal surfaces of the lead terminal) ranges preferably from 25 µm to 200 µm, inclusive, and more preferably from 25 µm to 100 µm, inclusive.

(Sealing Resin)

The capacitor element may be sealed with a sealing resin such that at least a part of the anode lead terminal and the cathode lead terminal is exposed.

Examples of the sealing resin include a cured product of a curable resin and an engineering plastic. Examples of the curable resin include epoxy resins, phenol resins, silicone resins, melamine resins, urea resins, alkyd resins, polyurethanes, and unsaturated polyesters. The engineering plastic includes a general engineering plastic and a super engineering plastic. Examples of the engineering plastic include polyimide and polyamide-imide.

Figure 5:
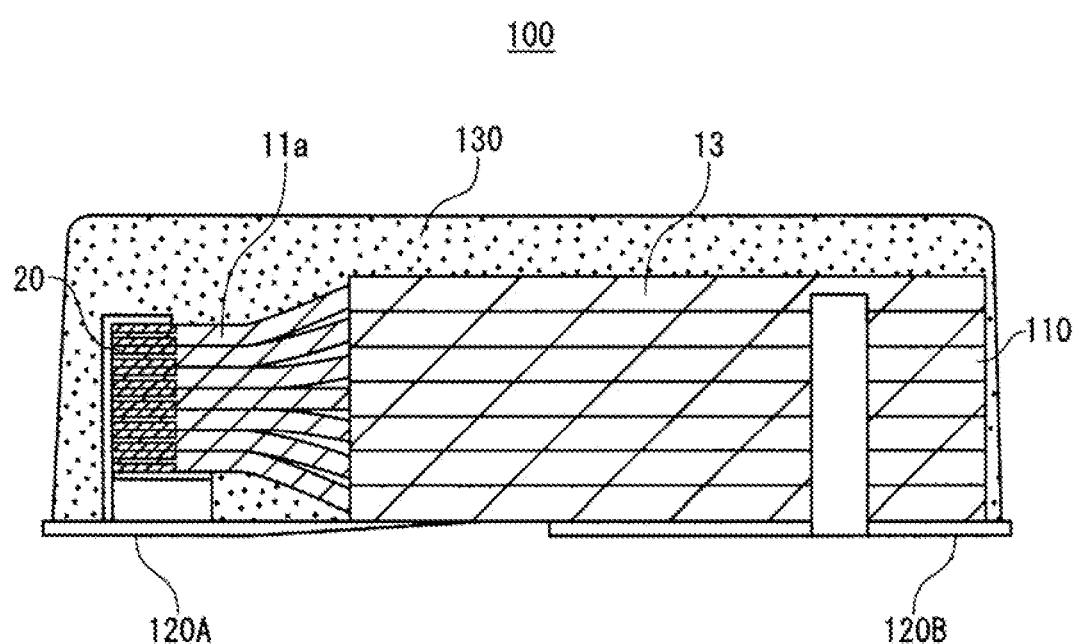
FIG. 5 is a cross-sectional view schematically illustrating an electrolytic capacitor according to an exemplary embodiment of the present invention.

FIG. 5 is a cross-sectional view schematically illustrating the electrolytic capacitor according to the present exemplary embodiment. Electrolytic capacitor 100 includes one or more capacitor elements 110, anode lead terminal 120A joined to anode part 11a, cathode lead terminal 120B joined to cathode layer 13, and sealing resin 130 for sealing capacitor elements 110.

[Method of Manufacturing Capacitor Element]

The capacitor element according to the present exemplary embodiment can be manufactured by the following method. The present exemplary embodiment includes a method of manufacturing a capacitor element.

A method of manufacturing a capacitor element according to the present exemplary embodiment includes: a preparation step of preparing an anode body including a porous region located at a surface of the anode body; a dielectric layer forming step of forming a dielectric layer that covers at least a part of the anode body; a thin-thickness region forming step of forming a thin-thickness region in the anode body by compressing or removing a part of the porous region; a stacking step of stacking a metal substrate on at least a part of the thin-thickness region; and a cathode forming step of forming a cathode layer on a cathode formation part in a part other than the thin-thickness region of the anode body. The metal substrate stacked is denser than the porous region in the cathode formation part.

Figure 6:
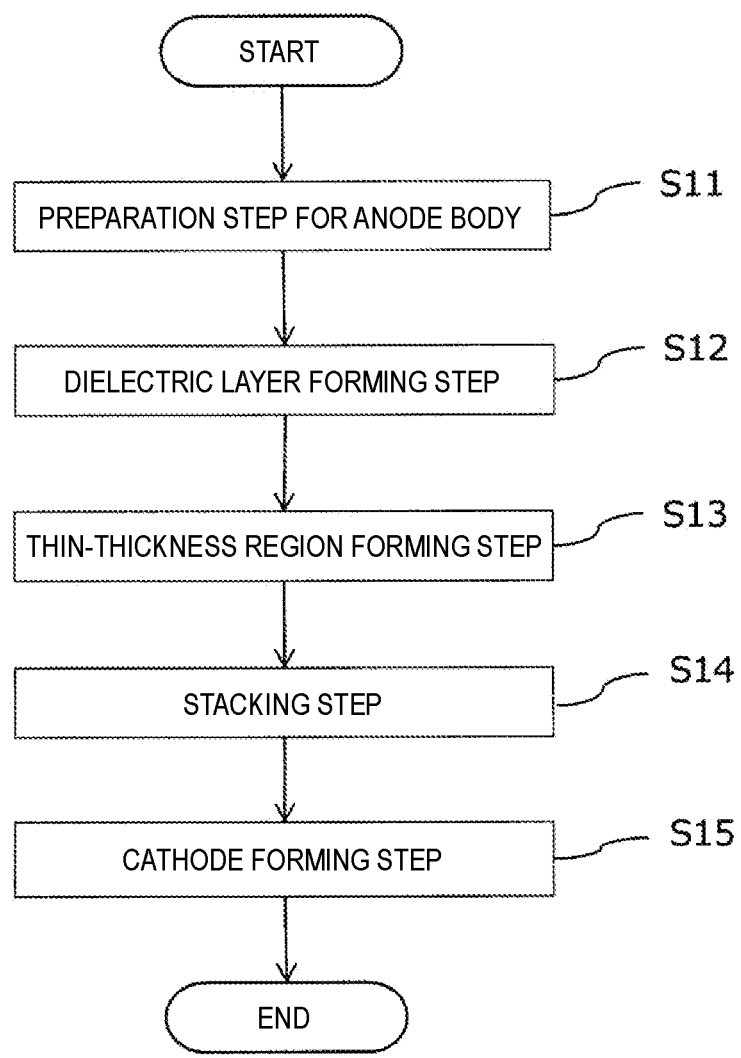
FIG. 6 is a flowchart showing a method of manufacturing the capacitor element according to the exemplary embodiment of the present invention.
Figure 7:
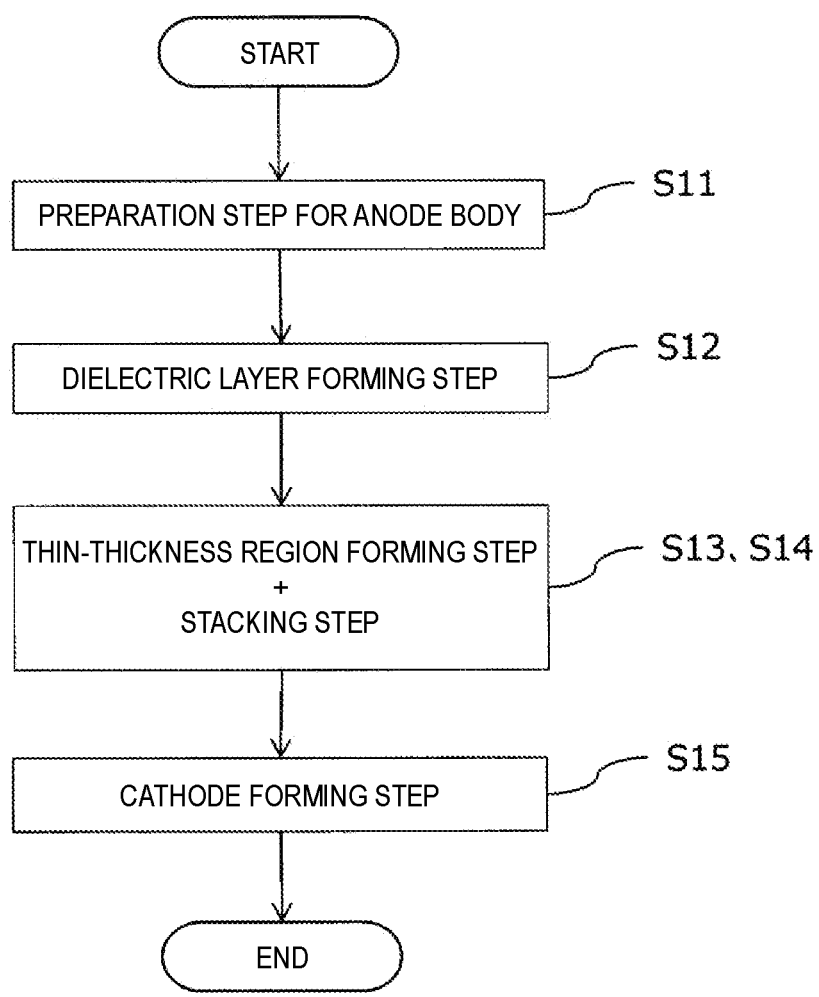
FIG. 7 is a flowchart showing a method of manufacturing the capacitor element according to another exemplary embodiment of the present invention.

FIG. 6 is a flowchart showing a method of manufacturing the capacitor element according to the present exemplary embodiment. FIG. 7 is a flowchart showing a method of manufacturing a capacitor element according to another exemplary embodiment.

(1) Preparation Step (S11)

As a raw material of the anode body, for example, a metal foil containing a valve metal is used. At least one principal surface of the metal foil is roughened. By the roughening, a porous region including a large number of fine pores is formed at least in a region close to a principal surface side of the metal foil.

The roughening is performed by, for example, electrolytic etching of the metal foil. The electrolytic etching can be performed by, for example, a direct current electrolyzing method or an alternating current electrolyzing method. Etching conditions are not particularly limited, and are appropriately set according to a depth of the porous region, a type of the valve metal, and the like.

(2) Dielectric Layer Forming Step (S12)

A dielectric layer is formed on a surface of the anode body. A method of forming the dielectric layer is not particularly limited. The dielectric layer can be formed, for example, by subjecting the anode body to an anodizing treatment. In the anodizing treatment, for example, the anode body is immersed in an anodizing solution, such as an ammonium adipate solution, and subjected to a heat treatment. The anode body may be immersed in an anodizing solution, and a voltage may be applied.

(3) Thin-Thickness Region Forming Step (S13)

The porous region of the anode body is partially compressed or removed to form a thin-thickness region having a small thickness in a part of the anode body. The remaining part of the anode body, which is not compressed or removed, includes a cathode formation part where a cathode layer is to be formed.

The porous region can be compressed by press working of an anode part. The removal of the porous region can be performed by cutting the porous region of the anode part.

(4) Stacking Step (S14)

A metal substrate is stacked on at least a part of the thin-thickness region. After the stacking, the stacked part of the metal substrate and the anode body may be pressed to bring the metal substrate and the anode body into close contact with each other. A metal foil having the same degree of porosity as the anode body may be used as the metal substrate. In this case, since the porous region of the metal substrate is compressed by the pressing after the stacking, the metal substrate is densified. The metal substrate to be stacked may be etched in the same manner as the anode body. A surface of the metal substrate to be stacked may be roughened.

From the viewpoint of securing strength, it is preferable that the stacking step (4) is performed immediately after the thin-thickness region forming step (3) or is performed simultaneously with the thin-thickness region forming step (3). In particular, it is preferable that the thin-thickness region forming step (3) and the stacking step (4) are simultaneously performed (see FIG. 7).

Specifically, the metal substrate is disposed so as to cover a part of the porous region, and the stacked part of the metal substrate and the anode body is pressed. As a result, the porous region is compressed to form a thin-thickness region, and the metal substrate is stacked on the thin-thickness region. At the same time, the metal substrate and the anode body are pressure-bonded. According to this method, the number of steps can be reduced, and furthermore, it is easy to dispose the metal substrate in the thin-thickness region.

(5) Cathode Forming Step (S15)

A solid electrolyte layer is formed on a surface of the dielectric layer. The solid electrolyte layer can be formed by chemical polymerization and/or electrolytic polymerization of a raw material monomer or oligomer under the presence of the anode body. The solid electrolyte layer may be formed by applying to the dielectric layer a solution in which a conductive polymer is dissolved or a dispersion liquid in which a conductive polymer is dispersed.

The raw material monomer or oligomer is a monomer or oligomer to be a raw material of the conductive polymer. Examples thereof include pyrrole, aniline, thiophene, and derivatives thereof. A polymerization solution to be used for the chemical polymerization and/or the electrolytic polymerization may contain the dopant described above in addition to the raw material monomer or oligomer.

Next, a carbon paste and a silver paste, for example, are sequentially applied to a surface of the solid electrolyte layer to form a cathode lead-out layer. As a result, a cathode layer is formed, and a capacitor element is obtained.

Note that the thin-thickness region forming step (3) and the stacking step (4) may be performed before the dielectric layer forming step (2) or after the cathode forming step (5). When a series of steps are performed by roll-to-roll, the thin-thickness region forming step (3) and the stacking step (4) are preferably performed before the dielectric layer forming step (2). Since the anode body is reinforced by the metal substrate, damage to the anode body during conveyance is easily suppressed. On the other hand, the thin-thickness region forming step (3) and the stacking step (4) are preferably performed after the cathode forming step (5) from the viewpoint of reducing the influence on the subsequent steps.

[Method of Manufacturing Electrolytic Capacitor]

The electrolytic capacitor according to the present exemplary embodiment can be manufactured by the following method. The present exemplary embodiment includes a method of manufacturing an electrolytic capacitor.

A method of manufacturing an electrolytic capacitor according to the present exemplary embodiment includes a step of preparing a capacitor element manufactured by the above method, and a joining step of stacking a plurality of the capacitor elements and welding the anode parts to each other. FIG. 8 is a flowchart showing a method of manufacturing an electrolytic capacitor according to the present exemplary embodiment.

(i) Step of Preparing Capacitor Element (S1)

At least one capacitor element is manufactured by the methods (1) to (5).

(ii) Joining Step (S2)

A plurality of the capacitor elements are stacked, and the anode parts are joined to each other.

At least one of the plurality of capacitor elements only has to be the capacitor element according to the present exemplary embodiment. The others may be conventionally known capacitor elements. Preferably, two or more of the plurality of capacitor elements disposed in the electrolytic capacitor are the capacitor elements according to the present exemplary embodiment. In this case, the thin-thickness regions are welded together with the metal substrate.

The welding method is not particularly limited, and an effect of the present exemplary embodiment can be obtained by any method. Examples of the welding method include laser welding, resistance welding, arc welding, gas welding, electron beam welding, and brazing. The laser welding is a method of melting and joining metal by irradiation with laser light. The resistance welding is a method of melting and joining metal using Joule heat generated by energization. The arc welding is a method of melting and joining metal using a discharge phenomenon in air. The gas welding is a method of melting and joining metal using a combustible gas. The electron beam welding is a method of melting and joining metal by colliding electrons emitted in vacuum. The brazing is a method of joining by interposing a brazing material having a melting point lower than that of a base material (in this case, the metal substrate or the anode body).

(iii) Lead Terminal Connecting Step (S3)

An anode lead terminal is electrically connected to the anode part, and a cathode lead terminal is electrically connected to the cathode layer. The electrical connection between the anode part and the anode lead terminal is performed, for example, by welding them by the above-described method. The electrical connection between the cathode layer and the cathode lead terminal is performed, for example, by adhering the cathode layer and the cathode lead terminal via a conductive adhesive.

(iv) Sealing Step (S4)

The capacitor element and a part of the lead terminal may be sealed with a sealing resin. The sealing is performed using a molding technique such as injection molding, insert molding, or compression molding. For example, a predetermined mold is used to fill the capacitor element and one end part of the lead terminal with a composition containing a curable resin or a thermoplastic resin so as to cover the capacitor element and the one end part of the lead terminal, and then heating or the like is performed.

In the electrolytic capacitor according to the aspect of the present invention, ESR is reduced. Thus, the electrolytic capacitor can be used for electrolytic capacitors for various applications in which low ESR is required.

The invention claimed is:

1. An electrolytic capacitor comprising a plurality of capacitor elements which are stacked, each of a first capacitor element and a second capacitor element that are adjacent to each other among the plurality of capacitor elements including:
   an anode body including a porous region located at a surface of the anode body;
   a dielectric layer that covers at least a part of the anode body; and
   a cathode layer that covers at least a part of the dielectric layer,
   wherein:
   the anode body includes an anode part and a cathode formation part on which the cathode layer is disposed, the cathode formation part being adjacent to the anode part,
   at least a part of the porous region of the anode part includes a thin-thickness region, the thin-thickness region being thinner than the porous region of the cathode formation part,
   a metal substrate is stacked on at least a part of the thin-thickness region,
   the metal substrate is denser than the porous region of the cathode formation part, a first surface of the metal substrate of the first capacitor element and a second surface of the metal substrate of the second capacitor element are in direct contact with each other, the first surface and the second surface facing each other, and the thin-thickness region of the first capacitor element and the thin-thickness region of the second capacitor element are joined via the metal substrate to be electrically connected with each other.

2. The electrolytic capacitor according to claim 1, wherein a surface of the metal substrate facing the thin-thickness region is roughened.

3. The electrolytic capacitor according to claim 1, wherein the metal substrate includes a metallic material that is same as a metallic material of the anode body.

4. The electrolytic capacitor according to claim 1, wherein in the cathode formation part, a thickness of the porous region is equal to or more than 95% of a thickness of the anode body.

5. The electrolytic capacitor according to claim 1, wherein the thin-thickness region includes a compression layer in which the porous region is compressed.

6. A method of manufacturing an electrolytic capacitor, the method comprising:
- a step of producing each of a plurality of capacitor elements, and
- a step of, after stacking the plurality of capacitor elements, welding the plurality of capacitor elements to each other, wherein:

the step of producing each of the plurality of capacitor elements includes:
- a preparation step of preparing an anode body including a porous region located at a surface of the anode body;
- a dielectric layer forming step of forming a dielectric layer that covers at least a part of the anode body;
- a thin-thickness region forming step of forming a thin-thickness region in the anode body by compressing or removing a part of the porous region;
- a stacking step of stacking a metal substrate on at least a part of the thin-thickness region; and
- a cathode forming step of forming a cathode layer on a cathode formation part in a part other than the thin-thickness region of the anode body, wherein:

the metal substrate stacked is denser than the porous region of the cathode formation part, in a first capacitor element and a second capacitor element that are adjacent to each other among the plurality of capacitor elements, a first surface of the metal substrate of the first capacitor element and a second surface of the metal substrate of the second capacitor element are in direct contact with each other, the first surface and the second surface facing each other, and the thin-thickness region of the first capacitor element and the thin-thickness region of the second capacitor element are joined via the metal substrate to be electrically connected with each other.

7. The method according to claim 6, wherein the thin-thickness region forming step and the stacking step are performed simultaneously so that, after the metal substrate is disposed to cover a part of the porous region, the metal substrate is stacked on the thin-thickness region while the porous region is compressed to form the thin-thickness region by pressing a part of the metal substrate that is disposed on the anode body.

8. The method according to claim 6, wherein the cathode forming step is performed after the stacking step.

9. The method of manufacturing an electrolytic capacitor according to claim 6, wherein the joining step is performed by a method selected from the group consisting of laser welding, resistance welding, arc welding, gas welding, electron beam welding, and brazing.

* * * * *